United States Patent
Kahler et al.

(10) Patent No.: US 6,697,941 B2
(45) Date of Patent: Feb. 24, 2004

(54) PORTABLE COMPUTER WITH CONFIGURATION SWITCHING CONTROL

(75) Inventors: Lara B Kahler, San Jose, CA (US); Steven L Fogle, Corvallis, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 608 days.

(21) Appl. No.: 09/777,357

(22) Filed: Feb. 5, 2001

(65) Prior Publication Data

US 2002/0108010 A1 Aug. 8, 2002

(51) Int. Cl.[7] ............................................. G06F 9/445
(52) U.S. Cl. ........................................................ 713/100
(58) Field of Search ..................................... 713/1, 2, 100

(56) References Cited

U.S. PATENT DOCUMENTS

| | | | |
|---|---|---|---|
| 5,822,531 A | * 10/1998 | Gorczyca et al. | 709/221 |
| 6,356,945 B1 | * 3/2002 | Shaw et al. | 709/231 |
| 6,374,352 B1 | * 4/2002 | Goldman et al. | 713/1 |
| 6,535,975 B1 | * 3/2003 | Thompson et al. | 713/1 |
| 6,647,434 B1 | * 11/2003 | Kamepalli | 710/14 |

* cited by examiner

Primary Examiner—Thomas M. Heckler

(57) ABSTRACT

A portable computer includes a control for switching the configuration of the computer. An operator predefines one or more sets of computer configurations, and programmably assigns a configuration set to the control. The configuration change from a current configuration to a predefined configuration is made effective at any given time by activating the control. Exemplary controls include a key stroke, a hardware button, a software button (such as activated by a key combination or clicking device), a voice command, and an input from a wired or wireless remote device.

24 Claims, 5 Drawing Sheets

PORTABLE COMPUTER WITH CONFIGURATION SWITCHING CONTROL

BACKGROUND OF THE INVENTION

This invention relates to portable computers, and more particularly, to a portable digital computer having an operator-generated input for configuration switching.

Portable computers, such as notebook computers, often are used to give presentations to an audience. An operator may program the notebook computer using a presentation software application to organize and sequence slides, video clips and/or audio clips. It is increasingly common to use multimedia tools in a presentation to enhance and increase the effectiveness of the presentation.

The computer often needs to interface with external devices such as projectors, big screen televisions, wireless pointing devices and speakers. These resources often are provided at the venue. It is common for hotels, trade centers, corporate offices and other venues with conferencing facilities to have big screen televisions, loudspeaker systems, pull down screens, or other peripheral devices and presentation aids. There are many makes, models, and interface protocols for these various external devices. Getting the computer to communicate with these devices typically requires reconfiguring the computer.

Exemplary configuration changes relate to video resolution, color depth, external monitor enable, television enable, activating a multi-monitor mode, setting a video timeout, dimming the display backlighting, altering a screen saver, adjusting audio volume, adjusting the hard drive timeout and system timeout, and altering the cooling mode. Such changes are for the purpose of enabling a presentation, selecting effective viewing and listening parameters, altering the personal desktop appearance from that of an individual user to a more presentation contextual appearance (e.g., more professional), and in some cases, for conserving power. All such changes relate generally to supporting an effective presentation.

Connecting the portable computer to these external devices and getting them to communicate properly can be difficult, frustrating and time consuming. On the spot configuration changes tend to detract from the effectiveness of the presentation and frustrate the presenter and audience. Accordingly, there is a need for a fast, easy and reliable way of making configuration changes.

SUMMARY OF THE INVENTION

According to the invention, a portable computer includes a control for switching the configuration of the computer. An operator predefines one or more sets of computer configurations, and programmably assigns a configuration set to the control. The configuration change from a current configuration to a predefined configuration is made effective at any given time by activating the control. In various embodiments the control is a key stroke, a hardware button, a software button (such as activated by a key combination or clicking device), a voice command, or an input from a wired or wireless remote device. An advantage of the configuration control is that it places the computer in a desired configuration for giving a presentation upon simple activation.

According to one aspect of the invention, a software program is invocable for allowing an operator to predefine one or more sets of computer configurations. In various embodiments, the software program also allows for the selection of various predefined configuration set ups, which are either embedded or created by the operator and stored. Alternatively or in addition, the software program allows the operator to change individual configuration parameters. The operator assigns a specific configuration set to the control.

According to another aspect of the invention, upon activating the control, the present computer configuration is altered to the previously specified configuration set up. In some embodiments, the presentation automatically is initiated following the configuration change, while in other embodiments, activation of the control alters the configuration without also starting the presentation.

According to another aspect of the invention, either upon toggling the control or at the completion of the presentation, depending on the embodiment, the configuration set up reverts to one of either the previous set up or a default set up.

An advantage of the control is that it is a fast, easy and reliable method for automatically making a configuration change when giving a presentation. The operator need not think through all the details of the change, and instead is able to focus on the presentation. These and other aspects and advantages of the invention will be better understood by reference to the following detailed description taken in conjunction with the accompanying drawings.

DESCRIPTION OF SPECIFIC EMBODIMENTS

Figure 1:
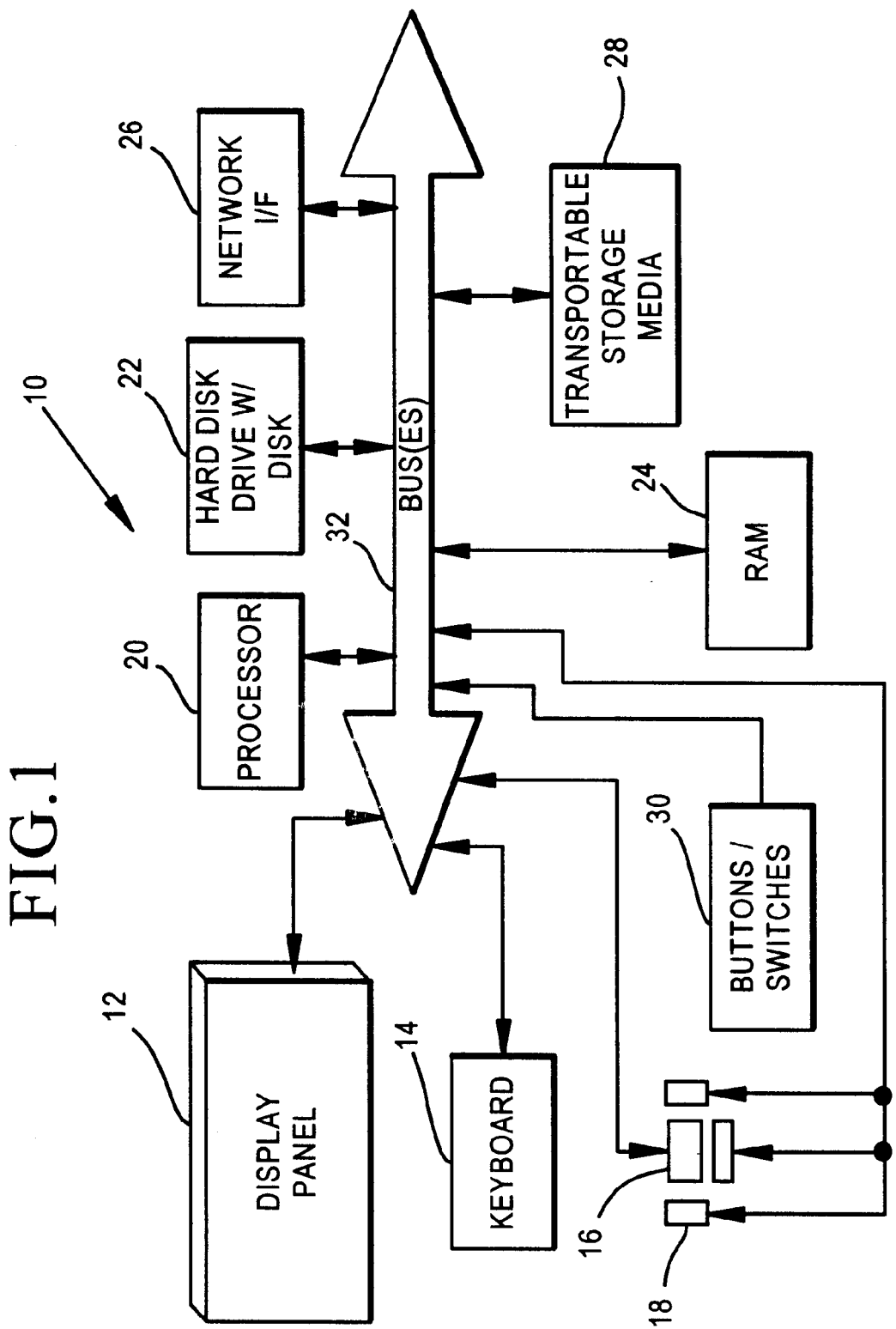
FIG. 1 is a block diagram of a host computer system according to an embodiment of this invention.

The functions of the present invention preferably are performed by a programmed general purpose digital computer 10 of the type which is well known in the art, an example of which is shown in FIG. 1. In a preferred embodiment the computer system 10 is a portable computer, such as a notebook-style computer system. In other embodiments the portable computer is a sub-notebook computer, palmtop computer or other hand-help, laptop, or other mobile or portable computing device.

The portable computer system includes a display device, one or more input devices, a processing device and one or more wired or wireless ports for interfacing with an external device. In an exemplary embodiment, the computer system 10 includes a display panel 12, a keyboard 14, a pointing device 16, a clicking device 18, a processor 20, a hard disk drive with hard disk 22, random access memory 24, and optionally—one or more network interfaces 26 (e.g., modem, ethernet adapter, infrared adapter), one or more transportable storage media drives 28 and media (e.g., CD-ROM drive, DVD-ROM drive, floppy disk drive, zip drive, bernoulli drive) and one or more extra buttons/ switches 30 (e.g., stop/eject, rewind, play, fast forward). The various components interface and exchange data and commands through one or more busses 32. The computer system 10 receives information by entry through the keyboard 24, pointing/clicking devices 16/18, the network interface 34, a microphone 35, or another input device or input port.

Figure 2:
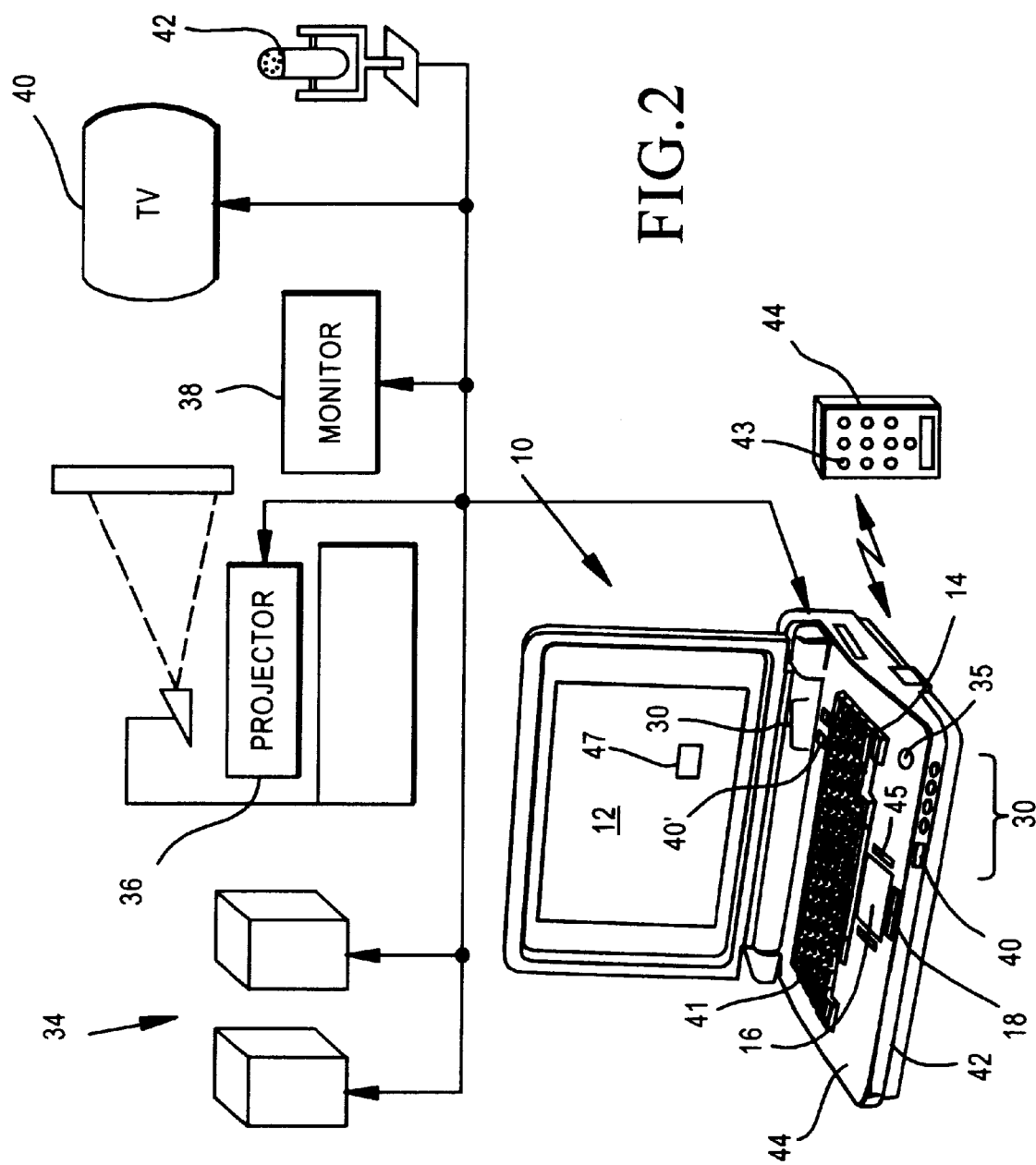
FIG. 2 is a connection layout of the computer system of FIG. 1 and external devices for giving a presentation according to an embodiment of this invention.

Referring to FIG. 2, the computer system 10 is coupled to one or more external devices, such as loud speakers 34, a projector 36, an external monitor 38, a big screen TV 40, and a microphone 42. A remote control 44 also is used in some embodiments. Various connection schemes may be used in different embodiments, included wired and wireless connections. Although several external devices 34–44 are shown in FIG. 2, the types of external devices to which the computer may connect may include other devices not shown. Also, although a connection layout is for several external devices, the computer may be interconnected to and configured to communicate with any one or more of such devices 34–44, and/or to other devices not shown.

Getting the computer system 10 to communicate with external devices for a presentation involves adjusting configuration parameters of the computer. Getting everything adjusted 'just right' to allow for an effective presentation is an added challenge. Rather than select the individual adjustments on-site at the time of the presentation, the operator instantly makes all the changes. Specifically, the computer system 10 includes a control which upon activation causes a predefined configuration change to be enacted. In one embodiment the control is a configuration button 40, included among the buttons and switches 30 on the computer. In one embodiment the configuration button 40 is located on a front panel 42 of the computer case 44, so as to be accessible even when the computer is closed. In another embodiment the configuration button 40 is located adjacent to the keyboard 14 of the case 44. In some embodiments the button 40 may be part of the keyboard 'footprint.' In one embodiment the button 40 is dedicated to making configuration changes, unlike the conventional alphanumeric keys and function keys of the conventional keyboard layout.

In other embodiments the control is a key 41 on the keyboard 14, a button 43 on the remote control 44, or a button 45 of the clicking device 18. In still other embodiments the control is a keystroke combination, a voice-activated command, or a software button 47 displayed on the display screen 12 and selected by keystroke, clicking device, pointing device or voice command. In the various embodiments the control preferably is quickly accessed and easily activated. Processing the control by the computer system includes automatically changing the computer configuration. For the voice command embodiment, the microphone 35 receives the voice command, and transduces it into a signal processed by the processor 20. For the software button 47, the button is displayed as part of a dialog box, window, menu, tab panel or other display construct.

An operator first runs a configuration set-up computer program to define one or more computer configurations. One or more configurations are predefined and stored. The operator is able to assign one set-up as to be a current configuration which takes effect which takes effect upon command from within or upon exiting the configuration set-up program. The operator also is able to assign a set-up to the control, (e.g., the presentation configuration). The operator exits the configuration set-up computer program. At any given time thereafter, the operator is able to switch the configuration to the presentation configuration by activating the control. In some embodiments the control toggles the configuration between the presentation configuration and another configuration (e.g., a default configuration; the prior configuration). Preferably, activation of the control is independent of the run status of the configuration set-up computer program. Thus, the control can be activated while the configuration set-up computer program is running, paused, or terminated.

Setting Up the Configuration Control

Figure 3:
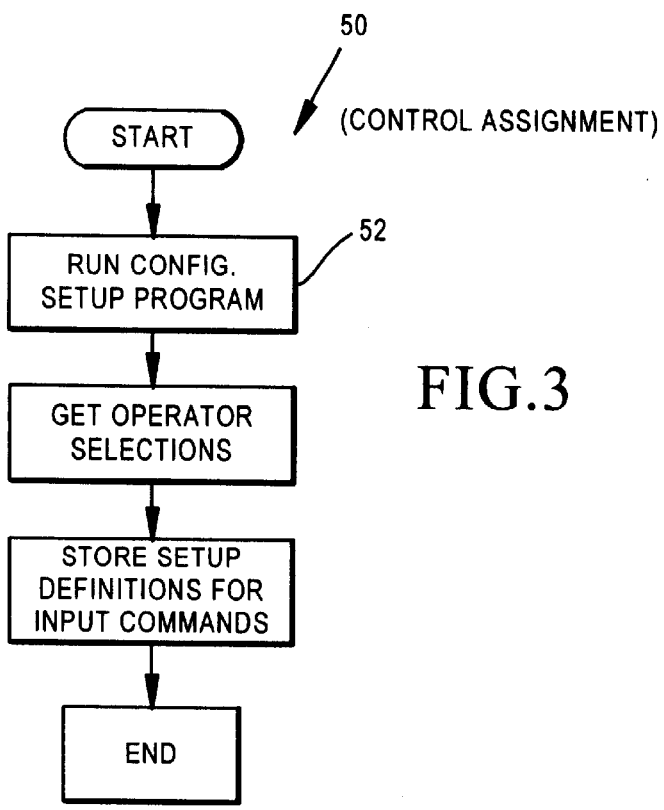
FIG. 3 is a flow chart of the configuration set up computer program according to an embodiment of this invention.
Figure 4:
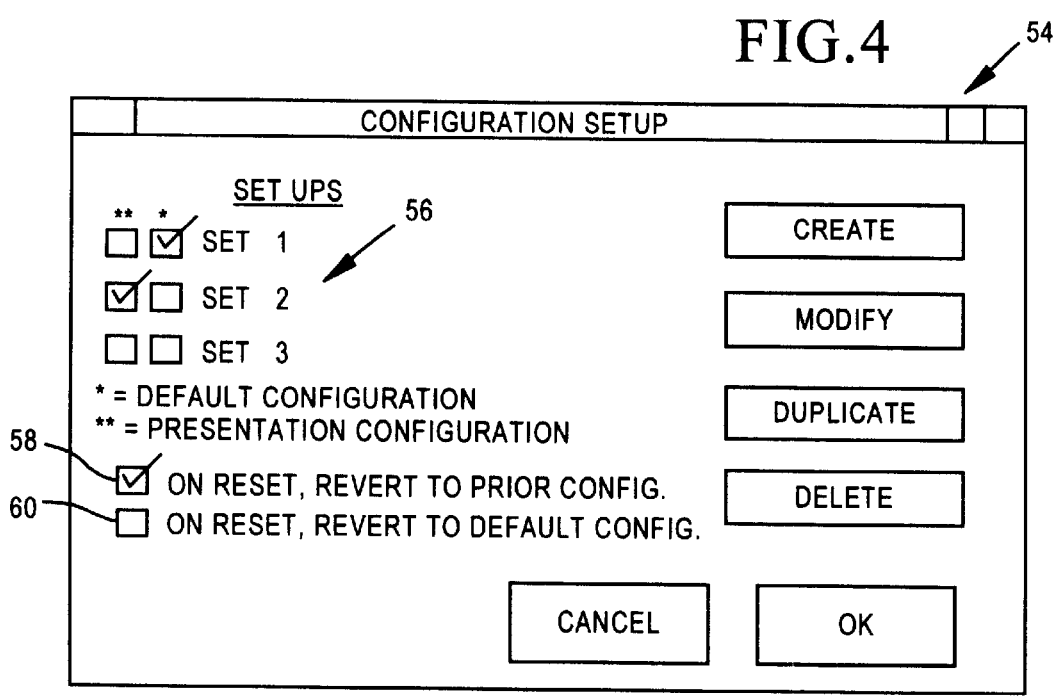
FIG. 4 is an exemplary display screen shown during execution of a configuration set up computer program for creating a presentation configuration to be assigned to a control.

Referring to FIG. 3, a flow chart 50 of steps for setting up a configuration and assigning a configuration to the control is shown. At step 52, an operator runs a configuration set up computer program. The operator makes configuration selections to the configuration set up computer program through a user interface. FIG. 4 shows an exemplary display screen 54 for the operator to make configuration selections. In one embodiment a list 56 of predefined or previously defined configurations are listed or are accessible for viewing.

The operator is able to create a new configuration, modify an existing configuration, duplicate an existing configuration, or delete an existing configuration. In the exemplary embodiment software 'buttons' are shown for entering such commands. The operator defines or selects one configuration to serve as a default configuration. Another configuration is selected to serve as the presentation configuration.

After a presentation the computer configuration is changed again. In some embodiments the change is automatic. In other embodiments the change is by reactivating the control. Such subsequent change of the computer configuration is referred to herein as resetting the configuration. In some embodiments the computer system reverts to the default configuration on the reset operation. In alternative embodiments the computer system reverts to the configuration which was current immediately prior to the activation of the presentation configuration. In still other embodiments, the operator selects how the computer acts, (whether the system reverts to the default configuration or the prior 'current configuration). Referring to the sample display screen of FIG. 4, the operator selects box 58 to assign the computer system to revert to the default configuration on a configuration reset, or selects box 60 to assign the computer system to revert to the prior 'current' configuration on a configuration reset.

Figure 5:
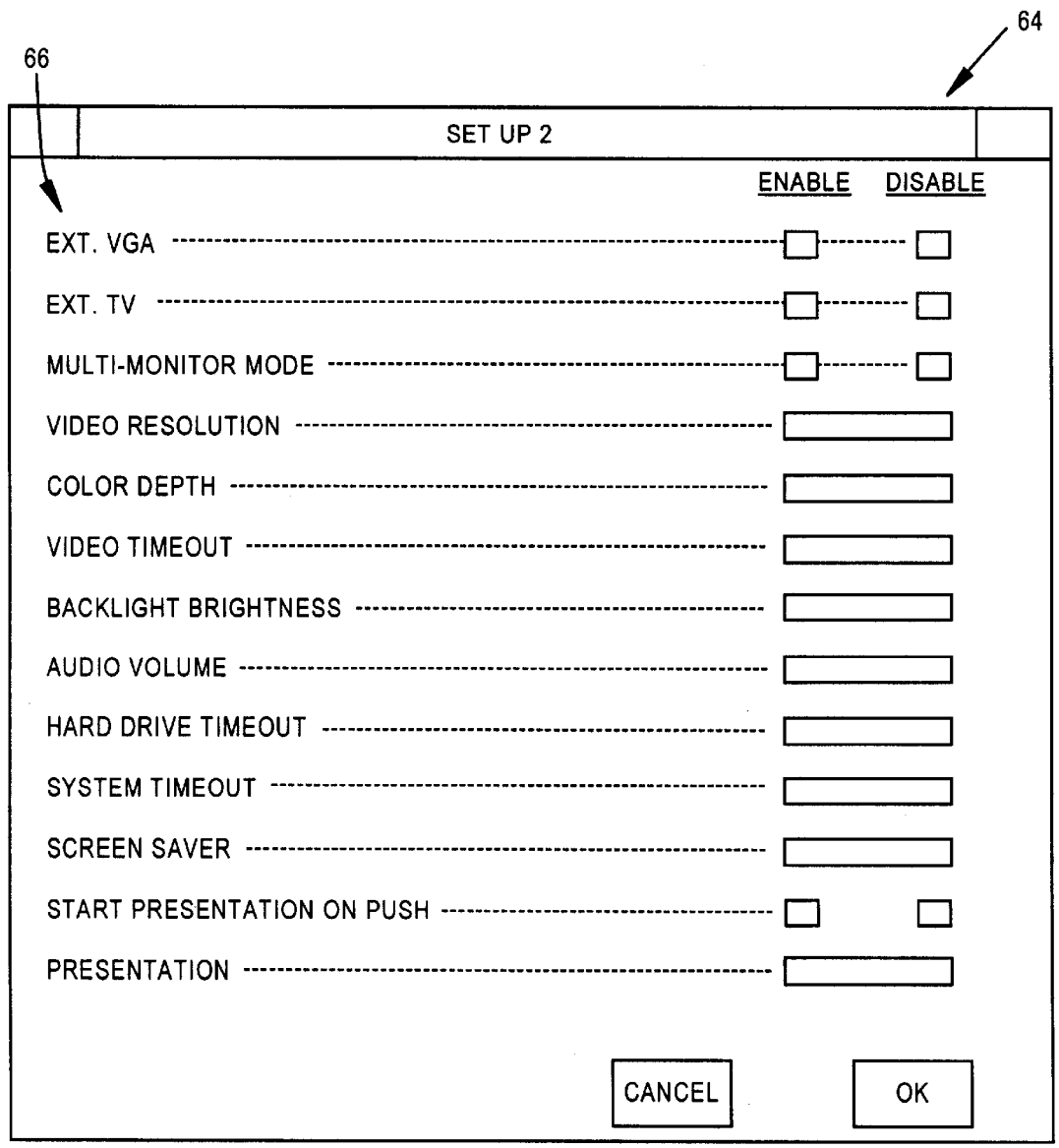
FIG. 5 is another exemplary display screen, including a non-exhaustive list of specific configuration parameters capable of being defined as part of a presentation configuration set up according to an embodiment of this invention.

In an exemplary display screen 64 for selecting configuration values shown in FIG. 5, a plurality of configuration parameters 66 are listed. The parameters listed are not meant to be an exhaustive list of configuration parameters, but exemplify the types of parameters that an operator may desire to change to set up a presentation configuration or another storable and recallable configuration. Other configuration parameters are included in alternative embodiments. Listed are the following configuration parameters: external VGA enable/disable; external television enable/disable; multi-monitor mode on/off; select a video resolution for the external monitor/TV or for the computer display panel; select a color depth for the external monitor or TV or for the computer display panel; select a video timeout, in which after such time period without computer system activity, a screen saver is invoked (or the screen blanked); select a backlighting brightness level; select an audio volume; select a hard drive timeout in which after such time period without computer system activity, the hard drive spins down; and select a system timeout, in which after such time period without computer system activity, the computer system goes into a 'reduced power consumption' sleep mode. In some embodiments the operator also can select whether to start the presentation automatically upon activating the configuration button 40 and making the configuration changes. In such case, an manner for selecting or inputting the presentation file/document also is included.

Control Operation

Figure 6:
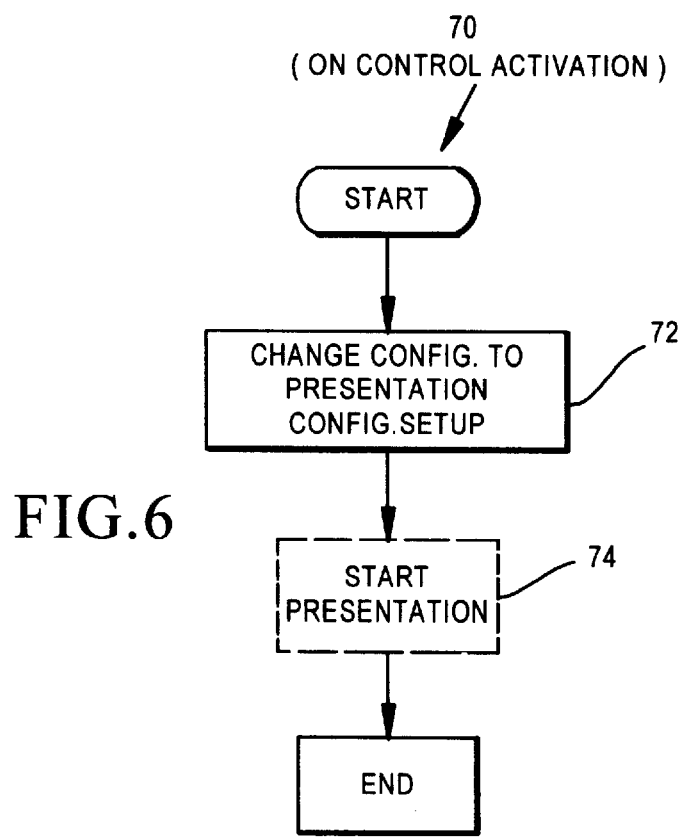
FIG. 6 is a flow chart of the computer system response to activation of the control.

Once the operator has created a presentation configuration set up and assigned such set up to the control, the control is ready to serve as a 'presentation ready' configuration control. The operator activates the control, such as by pressing a button, key or making another specific form of input. Such activation invokes a computer program 70 for processing the control activation. Referring to FIG. 6, a flow chart of the control activation program 70 is shown. At step 72, the computer system 10 changes the 'current' configuration values of the configuration parameters 66 to the configuration values defined in the presentation configuration. The presentation configuration, as discussed above, was previously selected from display screen 54. In some embodiments another step, step 74 is performed, in which the presentation automatically starts as part of the system response to the button activation.

Figure 7:
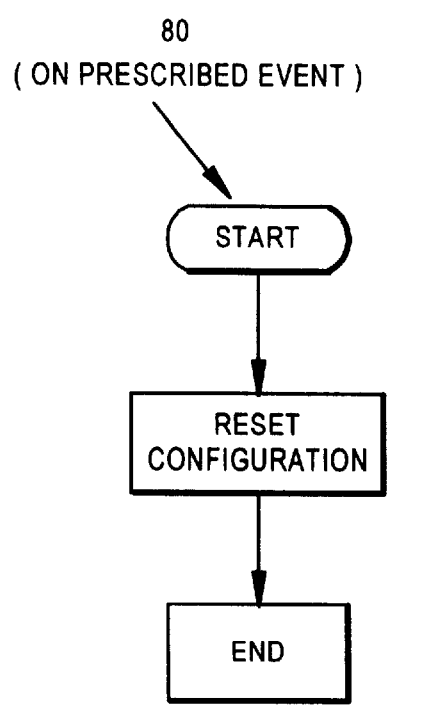
FIG. 7 is a flow chart of a computer program executed in response to a prescribed event to reset the computer configuration.

The operator then proceeds with the presentation. The computer system 10 communicates with one or more of the external devices to present information to an audience. Upon a prescribed event, the configuration is reset at step 82 (see FIG. 7)—either to the prior configuration that was current before the presentation configuration, or to the default configuration. In one embodiment the prescribed event is the termination or abortion of the presentation. In another embodiment the prescribed event is a subsequent activation of the control, (pressing the same button, key, keystroke combination, or entering an appropriate voice command). Note that in such other embodiment the control toggles between a first activation in which a presentation configuration is invoked and a second activation in which the configuration is reset. In some embodiments the configuration set up computer program used to assign the default configuration and the presentation configuration also includes the ability to make immediate changes to the configuration. Thus, the operator also can run the configuration setup program and select a configuration for the computer system to enter into immediately, and become the current configuration.

Meritorious and Advantageous Effects

An advantage of the configuration control scheme is that the control can be set up to place the computer in a desired configuration for giving a presentation with a single operator input (e.g., the push of a single button). The configuration control allows for a fast, effective configuration set up change.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A portable computer system, capable of interfacing with at least one peripheral device for presenting multimedia information, comprising:

a processor which executes a computer program for receiving a first set of operator inputs to predefine a presentation set of configuration values for a plurality of configuration parameters relating to a presentation of the multimedia information;

a control which upon a first activation causes a change from a current first set of configuration values to the presentation set of configuration values of the plurality of configuration parameters, and which upon a second activation causes a change from the presentation set of configuration values to a second set of configuration values of the plurality of configuration parameters.

2. The computer system of claim 1, in which the control is an operator input from a group of operator inputs, the group consisting of: a key stroke, a local hardware button, a button displayed on a display screen, a clicking device input, a voice input, a touchpad input and a remote input.

3. The computer system of claim 1, wherein the control comprises a voice command.

4. The system of claim 1, wherein the second set of configuration values is the first set of configuration values.

5. The system of claim 1, wherein the second set of configuration values is a default set of configuration values.

6. The system of claim 1, wherein the plurality of configuration parameters comprises two or more parameters from a group of parameters, the group consisting of: video resolution, color depth, external monitor enable/disable, TV enable/disable, multi-monitor mode on/off, video timeout, backlighting brightness, screen saver selection, audio volume, hard drive timeout, system timeout, and system cooling mode.

7. The computer system of claim 1, in which the control upon first activation further causes starting of the presentation.

8. A portable computer system, capable of interfacing with a variety of peripheral devices for presenting multimedia information, comprising:

a processor which executes a computer program for receiving operator inputs to predefine a presentation set of configuration values for a plurality of configuration parameters relating to a presentation of the multimedia information;

a control which upon activation changes a current first set of configuration values to the presentation set of configuration values for the plurality of configuration parameters and invokes starting of the presentation.

9. The computer system of claim 8, in which the control is an operator input from a group of operator inputs, the group consisting of: a key stroke, a local hardware button, a button displayed on a display screen, a clicking device input, a voice input, a touchpad input and a remote input.

10. The system of claim 8, wherein the computer program is a first computer program, and further comprising:

a second computer program executed by the processor for automatically reverting configuration values back to the first set of configuration values following a prescribed event.

11. The system of claim 10, wherein the prescribed event is termination of the presentation.

12. The system of claim 10, wherein the activation of the control is a first activation, and wherein the prescribed event is a second activation of the control after the first activation, the control toggling in function between the first activation and the second activation.

13. The system of claim 8, wherein the computer program is a first computer program, and further comprising:

a second computer program executed by the processor for automatically changing configuration values to a default set of configuration values following a prescribed event.

14. The system of claim 13, wherein the activation of the control is a first activation, and wherein the prescribed event is a second activation of the control after the first activation, the control toggling in function between the first activation and the second activation.

15. The system of claim 8, wherein the plurality of configuration parameters comprises two or more parameters from a group of parameters, the group consisting of: video resolution, color depth, external monitor enable/disable, TV enable/disable, multi-monitor mode on/off, video timeout, backlighting brightness, screen saver selection, audio volume, hard drive timeout, system timeout, and system cooling mode.

16. The system of claim 8, wherein the control comprises a button which is dedicated at least to changing from the first set of configuration values to the second set of configuration values.

17. A method for configuring a portable computer system to interface with a peripheral device for presenting multimedia information, comprising the steps of:

executing a computer program for predefining a presentation set of configuration values for the presentation;

activating a control;

in response to activation of the control changing from a current first set of configuration values to the presentation set of configuration values; and following a prescribed event, changing from the presentation set of configuration values to a second set of configuration values.

18. The method of claim 17, further comprising, during execution of the computer program, the step of:

receiving operator inputs for selecting the presentation set of configuration values for a plurality of configuration parameters.

19. The method of claim 17, further comprising in response to activation of the control, invoking the presentation.

20. The method of claim 17, wherein the prescribed event is termination of the presentation.

21. The method of claim 17, wherein the activation is a first activation, and wherein the prescribed event is a second activation of the control.

22. The method of claim 17, wherein the second set of configuration values is the first set of configuration values.

23. The method of claim 17, wherein the second set of configuration values is a default set of configuration values.

24. The method of claim 17, wherein the set of configuration values is for a plurality of configuration parameters, the plurality of configuration parameters comprising two or more parameters from the following set of parameters: video resolution, color depth, external monitor enable/disable, TV enable/disable, multi-monitor mode on/off, video timeout, backlighting brightness, screen saver selection, audio volume, hard drive timeout, system timeout, and system cooling mode.

\* \* \* \* \*